US007054334B2

United States Patent
Nakagawa et al.

(10) Patent No.: US 7,054,334 B2
(45) Date of Patent: May 30, 2006

(54) PATHSIZE CONTROL METHOD AND OPERATION OF TRANSMISSION APPARATUS

(75) Inventors: Yoshimi Nakagawa, Yokohama (JP); Satoko Araki, Yokohama (JP); Takao Iwata, Yokohama (JP); Takeshi Sato, Yokohama (JP); Keiji Usuba, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 786 days.

(21) Appl. No.: 09/918,537

(22) Filed: Aug. 1, 2001

(65) Prior Publication Data
US 2002/0075863 A1 Jun. 20, 2002

(30) Foreign Application Priority Data
Dec. 20, 2000 (JP) ............................. 2000-387034

(51) Int. Cl.
  H04J 3/16 (2006.01)
  H04L 12/28 (2006.01)
  H04L 12/56 (2006.01)
(52) U.S. Cl. ..................... 370/471; 370/392; 370/468
(58) Field of Classification Search ............... 370/468, 370/477, 404, 405, 395.1, 395.51, 472, 471, 370/392
See application file for complete search history.

(56) References Cited

U.S. PATENT DOCUMENTS

| 5,265,096 | A | | 11/1993 | Parruck | |
|---|---|---|---|---|---|
| 5,572,513 | A | * | 11/1996 | Yamamoto et al. | 370/217 |
| 5,872,780 | A | * | 2/1999 | Demiray et al. | 370/359 |
| 5,953,338 | A | * | 9/1999 | Ma et al. | 370/395.21 |
| 6,094,440 | A | * | 7/2000 | Sugawara et al. | 370/465 |
| 6,205,154 | B1 | * | 3/2001 | Schmidt et al. | 370/458 |
| 6,744,767 | B1 | * | 6/2004 | Chiu et al. | 370/395.21 |
| 6,785,285 | B1 | * | 8/2004 | Romana et al. | 370/395.51 |

(Continued)

FOREIGN PATENT DOCUMENTS

JP        697952        4/1994

(Continued)

OTHER PUBLICATIONS

GR-253-CORE, SONET Transport Systems: Common Criteria, Network Compatibility, Issue 2, Dec. 1995, Revision 2, Jan. 1999, pp. 2-1-2-2.

(Continued)

Primary Examiner—Ricky Q. Ngo
Assistant Examiner—Feben Micael Haile
(74) Attorney, Agent, or Firm—Mattingly, Stranger, Malur & Brundidge, P.C.

(57) ABSTRACT

The invention has an object of enhancing the service capacity and the operability of a network and simplifying the maintenance and control of the network by adopting a size automatic change mode after a path is set and providing arbitrary pathsize at arbitrary time. To achieve the object, the following means is provided. The service capacity and the operability of a network are enhanced and the maintenance and control of the network are simplified by adopting a size automatic change mode that the size of an input path signal conforms to information written to line overhead H1 and H2 bytes and an output path signal is transmitted with the pathsize the same as the size of the input path signal. A case that receiving path size changes exceeding a band and the fault of a path is caused occurs by providing both modes of fixing pathsize and automating pathsize to a user, flexibly corresponding to various service and automatically changing pathsize. At this time, an operation system identifies the cause, analyzes an influenced range and realizes the simplification of the maintenance and control of the network.

4 Claims, 5 Drawing Sheets

U.S. PATENT DOCUMENTS

2002/0059408 A1 * 5/2002 Pattabhiraman et al. .... 709/223

FOREIGN PATENT DOCUMENTS

| JP | 7283620 | 10/1995 |
|---|---|---|
| JP | 10135974 | 5/1998 |
| JP | 2000209201 | 7/2000 |
| JP | 2000232472 | 8/2000 |
| WO | 9727693 | 7/1997 |
| WO | 9813961 | 4/1998 |
| WO | 9823051 | 5/1998 |

OTHER PUBLICATIONS 5.4.1.3.2 Sink Direction, Interfaces, Recommendation G.783, Apr. 1997, pp. 96-140.

* cited by examiner

PATHSIZE CONTROL METHOD AND OPERATION OF TRANSMISSION APPARATUS

BACKGROUND OF THE INVENTION

1. Field of the Invention

The present invention relates to a crossconnecting device used for a synchronous digital hierarchy (SDH) transmission apparatus or a synchronous optical network (SONET) transmission apparatus and an operation system for monitoring and controlling the transmission apparatus.

2. Description of the Related Art

Paths (a bundle of channels) different in a destination are multiplexed on a transmission line, these paths are converged, are isolated or are interchanged by a crossconnecting device and are transmitted on a suitable line. The crossconnecting device can enhance the utilization efficiency of a transmission line network and can produce an economical and reliable path. To monitor and control the crossconnecting device, an operation system constituted of an information processing unit such as a workstation and a personal computer is connected.

Heretofore, in a network of transmission apparatus using an SDH/SONET system, the size of a path (physically equivalent to transmission speed) is specified beforehand when a path is set and afterward, is kept fixed. Only when a path is set, the size can be changed and in case the size is to be changed, the path is once required to be released.

However, in a conventional type path setting system, the description of the size is not included as in "6. Higher order SDH path layer" of ITU G.783 Standard which is a standard of a multiplexer and Bellcore GR-253-Core Standard (refer to FIGS. 2-1, 2-2).

To correspond to multimedia such as a high quality television in future, the realization of a broadband integrated service digital network (ISDN) is essentially required, to realize broadband ISDN, an asynchronous transfer mode (ATM) is also important technology and they are expected as the information communication infrastructure of the twenty-first century.

Therefore, in future, it is estimated that computerization will be further developed together with the rapid change of economics, public society, life and culture in addition to the progress of technology. A future transmission network is required to be simple and to have high operability so that the network can flexibly correspond to various service. Further, to reduce the cost, the operation, the maintenance and the control of the network are also required to be simplified.

Under such a situation, in a network of transmission apparatus using the conventional type SDH/SONET system, the size of a path is fixedly managed, it is not allowed as a system that pathsize is changed after a path is set and in case the size is to be changed, new pathsize is required to be set again. Under such a situation, it is difficult to enhance the service capacity and simplify the maintenance and control of the network.

SUMMARY OF THE INVENTION

The invention has an object of enhancing the service capacity and the operability of a network and simplifying the maintenance and control of the network by adopting a size automatic change mode after a path is set and providing arbitrary pathsize at arbitrary time.

To solve the above-mentioned problems, the following means are provided.

The size of an input path signal is written to line overhead H1 and H2 bytes equivalent to one of parts (overheads) added to main information (a payload). The service capacity and the operability of a network are enhanced and the maintenance and control of the network are simplified by adopting a pathsize automatic change mode of transmitting an output path signal with the pathsize the same as the size of the input path signal.

Both modes of fixing pathsize and automating pathsize are provided to a user to flexibly correspond to various service.

A case that receiving path size changes exceeding a band physically or logically allowed and a fault of a path is caused occurs by automatically changing pathsize according to the size of an input signal. At this time, an operation system identifies the cause, analyzes an influenced range and realizes the simplification of the maintenance and control of a network.

Further, the invention provides plural crossconnecting devices connected via a physical link in a network constituted of transmission apparatus using an SDH/SONET system and a monitoring system that monitors and controls them which is provided with means for monitoring pathsize and determining receiving path size and which is provided with a function for automatically changing the size of a receive/transmit path according to input path size under control by the means.

Furthermore, the invention provides an operation system which identifies a crossconnecting device and a path respectively directly causing overpathsize and analyzes a range of a fault based upon a overpathsize alert and the connection of a path respectively received from a transmission apparatus in a network constituted of transmission apparatus using an SDH/SONET system and a monitoring system that monitors and controls them and provides GUI that enables a user to promptly correspond.

BRIEF DESCRIPTION OF THE DRAWINGS

FIG. 3(2) shows a path automatic change mode which is a new method,

FIG. 3(2)(a) shows a state before size is changed and

FIG. 3(2)(b) shows a state after the size is changed;

DETAILED DESCRIPTION OF THE PREFERRED EMBODIMENTS

Figure 1:
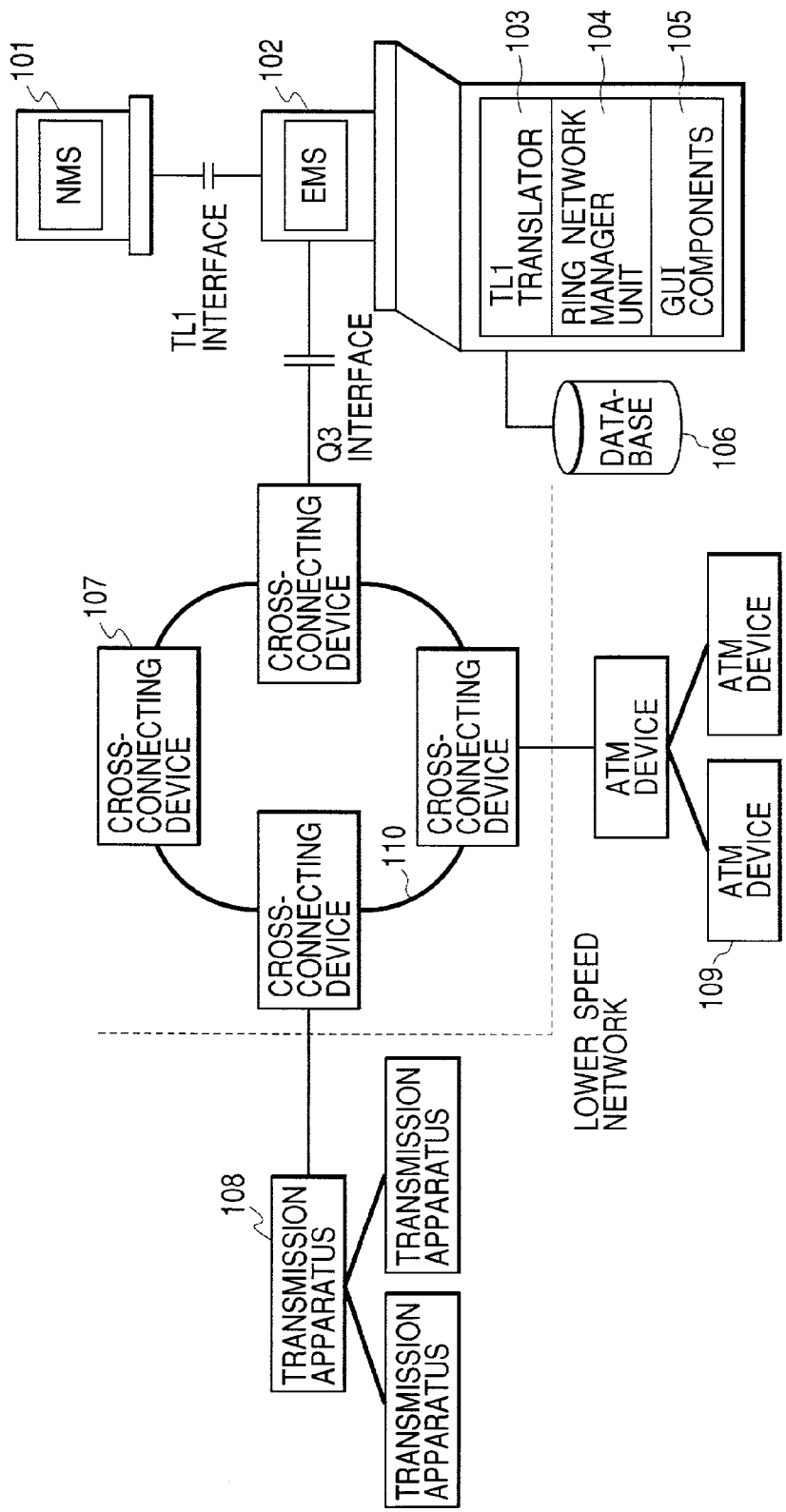
FIG. 1 is a block diagram showing the configuration of transmission apparatus and an operation system according to the invention.

Referring to the drawings, embodiments of the invention will be described below.

FIG. 1 is a block diagram showing a transmission apparatus according to the invention and a network system for monitoring and controlling it. Monitor and control element manager system (EMS) 102 is constituted by an information processing unit such as a personal computer and a workstation, monitors and controls plural crossconnecting devices via a Q3 interface.

The crossconnecting device 107 is one of network elements (NE), plural nodes are connected via a high speed transmission line 110 (equivalent to an optical fiber having the capacity of 10 Gbytes) and constitute a ring network.

Each node is equivalent to a crossconnecting device (that is, a device for setting a path that is provided with a function for transmitting or passing a received frame between networks at the same speed level, transmitting a frame from a high speed network to a lower speed network and transmitting a frame from a lower speed network to a high speed network), to explain referring to FIG. 1, a signal transmitted from another lower speed network which is at a lower hierarchy, that is, another transmission apparatus 108 and an ATM device 109 can be received via a transmission line, can be multiplexed on a high speed transmission line toward another node on a ring, a signal transmitted via the high speed transmission line from another node on the ring can be passed to further another node and can be isolated from the high speed transmission line to a low speed transmission line toward a lower speed network.

The Q3 interface means a protocol defined between EMS 102 and the crossconnecting device 107 and is a network control interface defined based upon an international standard depending upon International Telecommunication Union (ITU)-Telecommunication recommendation. Further, the Q3 interface is equivalent to one of interfaces defined for a telecommunications management network (TMN) and conforms to open systems interconnection (OSI).

In the network system configured as described above, in case a fault occurs on a transmission line between nodes, a node that detects this fault promptly transmits information to EMS 102 via the Q3 interface. The EMS that receives the fault information first instructs a ring network manager unit 104 operated as a function (the brain part) of ring network management for monitoring and controlling a transmission apparatus to analyze the fault and simultaneously instructs GUI components 105 operated as a graphical user interface (GUI) for output on a screen and data input to report a state of the fault to a user.

A TL1 translator 103 communicates information such as receives a request from NMS, responds to NMS and informs NMS via a network management system (NMS) 101 which is a high-order management system and a TL1 interface.

The transaction language 1 (TL1) interface means the generic name of commands defined in Bellcore standard and is a standard interface in North America.

EMS 102 is provided with a database 106 that unifies and manages the all path information of each NE and inputs the information for setting a path based upon the information of the path managed in the database.

Figure 2:
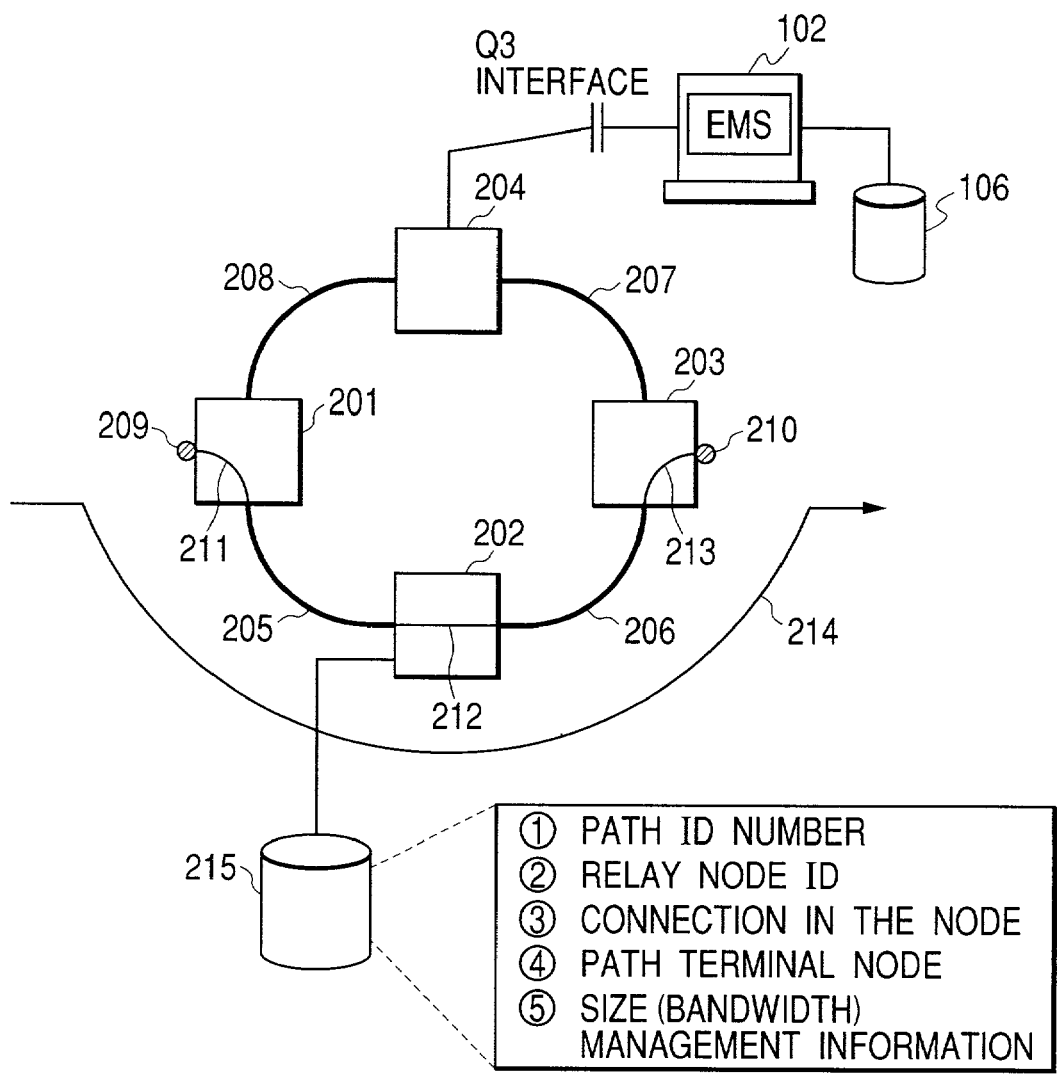
FIG. 2 shows an example of a path control method according to the invention.

FIG. 2 is a block diagram showing a path control system of a crossconnecting device according to the invention.

FIG. 2 shows a ring network connecting the crossconnecting devices shown in FIG. 1 as a node.

Terminals 1 to 192 equivalent to path termination are provided to each node 201 to 204 as terminals on the input side and terminals on the output side.

For example, a path 214 is set via physical links 205 and 206 (equivalent to an optical fiber having the capacity of 10 Gbytes) between the path terminations 209 and 210 of the two nodes 201 and 203.

Connection 211, 212 and 213 is set every node (that is, every crossconnecting device) 201, 202, 203 to realize the path 214. The detailed information of a path including the established route of the path, that is, a path identification number, a relay node number, the termination of the path and a state of connection in a node are stored in a database 215 of path information every node 201, 202, 203, 204.

Similarly, EMS 102 is also provided with the database 106 that unifies and manages all path information of each node.

For receiving path size, two modes for a control method of a mode of fixedly setting pathsize and an input pathsize automatic change mode exist and a user can select either. This information is also stored in the databases 106 and 215 as size (band) management information.

Figure 3:
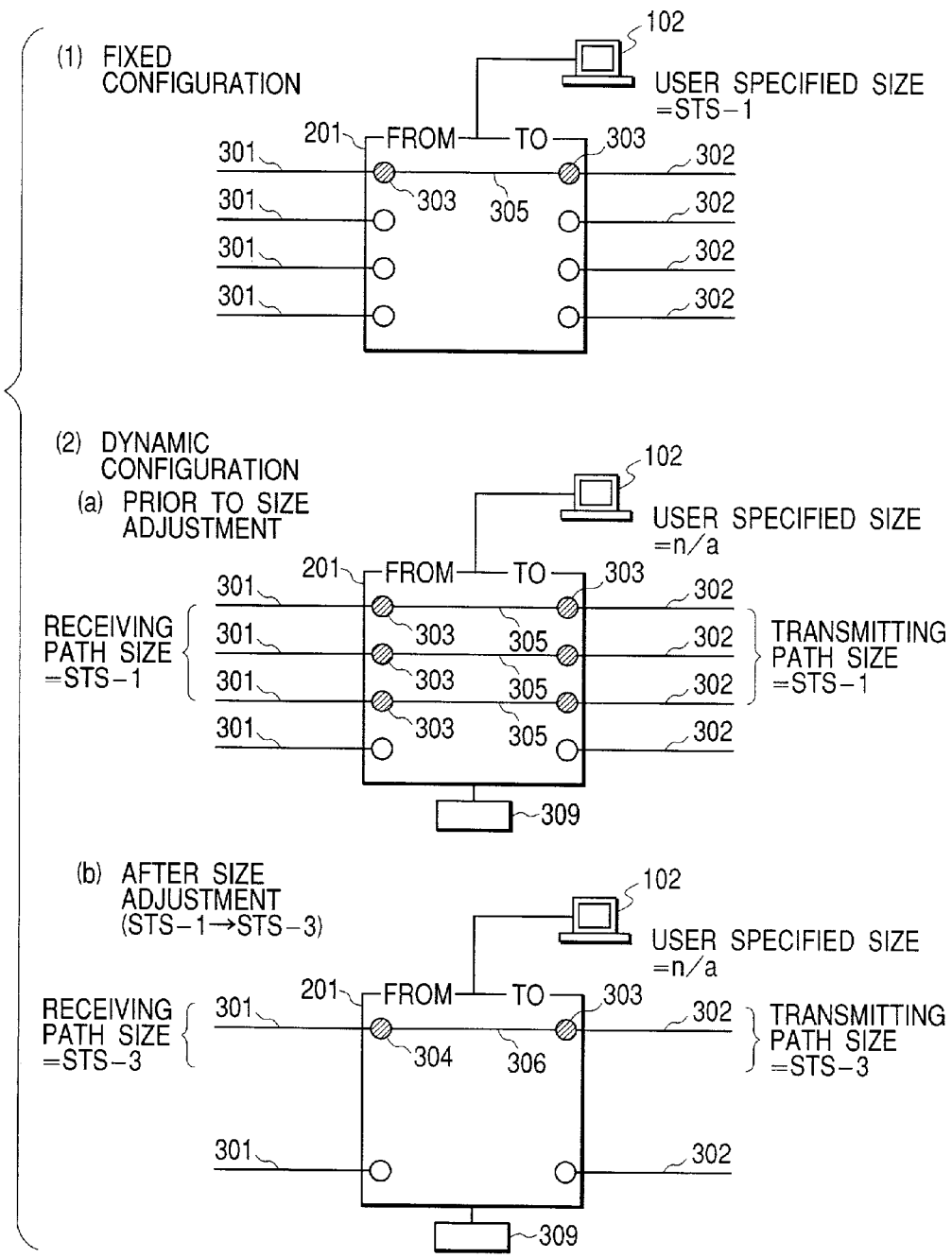
FIG. 3(1) shows a conventional type path fixation mode.

FIG. 3(1) shows the pathsize fixation mode.

First, according to specified information in a path setting request from EMS 102, an STS-1 path 305 is crossconnected by connecting the terminations 303 of STS-1 at two points of From (on the input side) and To (on the output side) of the node 201 with pathsize STS-1 (a synchronous transmission signal of the transmission speed of 52 Mbps).

Until a path release request is issued from EMS, the size of the path is fixed to STS-1.

In an SDH/SONET frame, H1 and H2 bytes (pointers located at the head of a frame which is a set of data) which are an index for determining the size of a path are defined for a line overhead.

Therefore, the pathsize of a transmit path signal 302 is converted to transmit H1 and H2 bytes based upon STS-1 specified by EMS and a frame is transmitted.

In other words, the pathsize of a transmit path signal 302 is determined according to STS-1 specified by EMS and a frame is transmitted.

Similarly, on the receive side, pathsize is also shown in receive H1 and H2 bytes, however, as the size of a path conforms to STS-1 specified by EMS, the receive H1 and H2 bytes are ignored.

In other words, H1 and H2 bytes are also included in a frame received on the receive side, however, pathsize is determined according to STS-1 specified by EMS at the node 201 and the H1 and H2 bytes are ignored.

That is, for the path 214 shown in FIG. 2, the size of the path is required to be specified by EMS in the crossconnection of the connection 211, 212 and 213.

FIG. 3(2) shows the pathsize automatic change mode.

In the case of the pathsize automatic change mode, pathsize is never specified by EMS 102 when a path setting request is received differently from the pathsize fixation mode.

The size of a path 305 connecting terminations 303 at two points of From (on the input side) and To (on the output side) of the node 201 is determined based upon H1 and H2 bytes for the overhead of a signal frame and which determine the size of a received path signal 301, that is, the pathsize of the received path signal 301. For the size of a transmitted path signal 302, a value of the same pathsize as the size of the received path signal 301 is written to the H1 and H2 bytes for the overhead of the transmitted path signal 302 and the transmitted path signal is transmitted to an adjacent node.

Therefore, in case the size of the received path signal is respectively STS-1, three STS-1 paths 305 connecting the terminations 303 of STS-1 at two points of From (on the input side) and To (on the output side) in the node 201 are crossconnected.

A pathsize determination transmitting unit 309 is provided inside the node 201 and is provided with a function for checking H1 and H2 bytes for the overhead of the received path signal 301, determining pathsize, writing information in overhead H1 and H2 bytes to the overhead of the transmitted path signal 302 and transmitting the transmitted path signal via the path 305 in a crossconnected state. ((a) A case before pathsize is changed).

Next, in case the contents of H1 and H2 bytes change and the size of the received path signal 301 changes from STS-1 to STS-3, three STS-1 paths 305 respectively connecting the terminations 303 of STS-1 before pathsize is changed in the node 201 change to an STS-3 path 306 connecting terminations 304 at two points of From (on the input side) and To (on the output side). ((b) A case after pathsize is changed).

For the transmitted path signal 302, a signal of the size of STS-3 is transmitted. That is, for the path 214 shown in FIG. 2, when the size of an input path is changed for the path termination 209 of the node 201, the size of the connection 211, 212 and 213 is automatically changed.

In the case after pathsize is changed in (b), a unit 309 provided inside a node 201 shown in FIG. 3(2)(*b*) is provided with the same function as that of the pathsize determination transmitting unit 309 before pathsize is changed in (a).

In case a network manager provides a certain path to a user, he/she lends a bundle of paths in units of band which is the largest unit of a bundle of paths managed by the network manager.

In case a band of STS-12 is specified in lending a path, the user actually operate in arbitrary combination of "STS-12c", "STS-3c×4" and "STS-3c×3+STS-1×3". "c" means concatenation (continuation) and for example, "STS-12c" shows paths of capacity equivalent to 12 pieces of STS-1.

At this time, there is no problem in the conventional type pathsize fixation mode, however, in the pathsize automatic change mode, there is the following limitation. The size of a path should not exceed a band specified by a network manager. That is, the size of a path should not be changed across plural bands. The reason is that as a band is the largest unit of a bundle of paths managed by a network manager, different bands mean that users using a path are different. In case users are different, paths are also different.

Therefore, in FIG. 2 showing the path control method, suppose that a band STS-3c No. 1 (equivalent to a path set between the path terminations 209 and 210 of two nodes 201 and 203 via physical links 205 and 206) is provided to a user A, a band STS-3c No. 2 (equivalent to a path set between terminations except the path terminations 209 and 210 of the two nodes 201 and 203 via physical links 207 and 208) is provided to a user B, a band STS-3c No. 3 (equivalent to a path set between the path terminations of two nodes 201 and 202 via a physical link 205) is provided to a user C, a band STS-3c No. 4 (equivalent to a path set between the path terminations of the two nodes 201 and 202 via the physical links 206, 207 and 208) is provided to a user D and the size of paths is STS-3c, STS-1×3, STS-1×3 and STS-3c in order from the user A.

However, in case the size of a path that passes the band of the user A changes from STS-3c to STS-12c by mistake, a signal of STS-12c is transmitted because a pathsize automatic recognition system is adopted and line failure occurs on a path that respectively passes the bands of the users A, B, C and D the managers of whom are different.

As described above, in case the size of a receive path at each node is changed across bands, line failure occurs on the path and may have a large effect upon users. As the pathsize automatic change mode is selected, it is impossible to remove the possibility of the occurrence of line failure on a path by the wrong change of size, however, it is possible to shorten the time of line failure on the path and minimize an effect upon users.

Measures in case the change of wrong size occurs will be described below.

In case path control is executed using the above-mentioned automatic change mode and the change of pathsize exceeding a band specified by a network manager occurs, EMS which is an operation system only recognizes the automatic change of pathsize, it is very difficult that EMS completely grasps failure and therefore, EMS itself does not issue an alert.

According to examination by these inventors, an alert of a path level, for example an alarm indication signal (AIS) and loss of a pointer (LOP) may be detected depending upon the connection of a path, however, the true identification of a cause is difficult by only this information. In case line failure occurs on a path, an alert showing line failure is also detected by a path terminating device, however, it takes time to some extent to identify the true cause.

The recommendation of the provision of a managed object standardized in ITU and SONET does not include the definition of a control method when a problem occurs.

Therefore, in case path control is executed using the automatic change mode and the change of the size of a path exceeding a band specified by a network manager occurs, it is newly proposed from a node (the receiving side) that recognizes the wrong change of size to the operation system that an alert is issued. The new alert is called an overpathsize alert.

Figure 4:
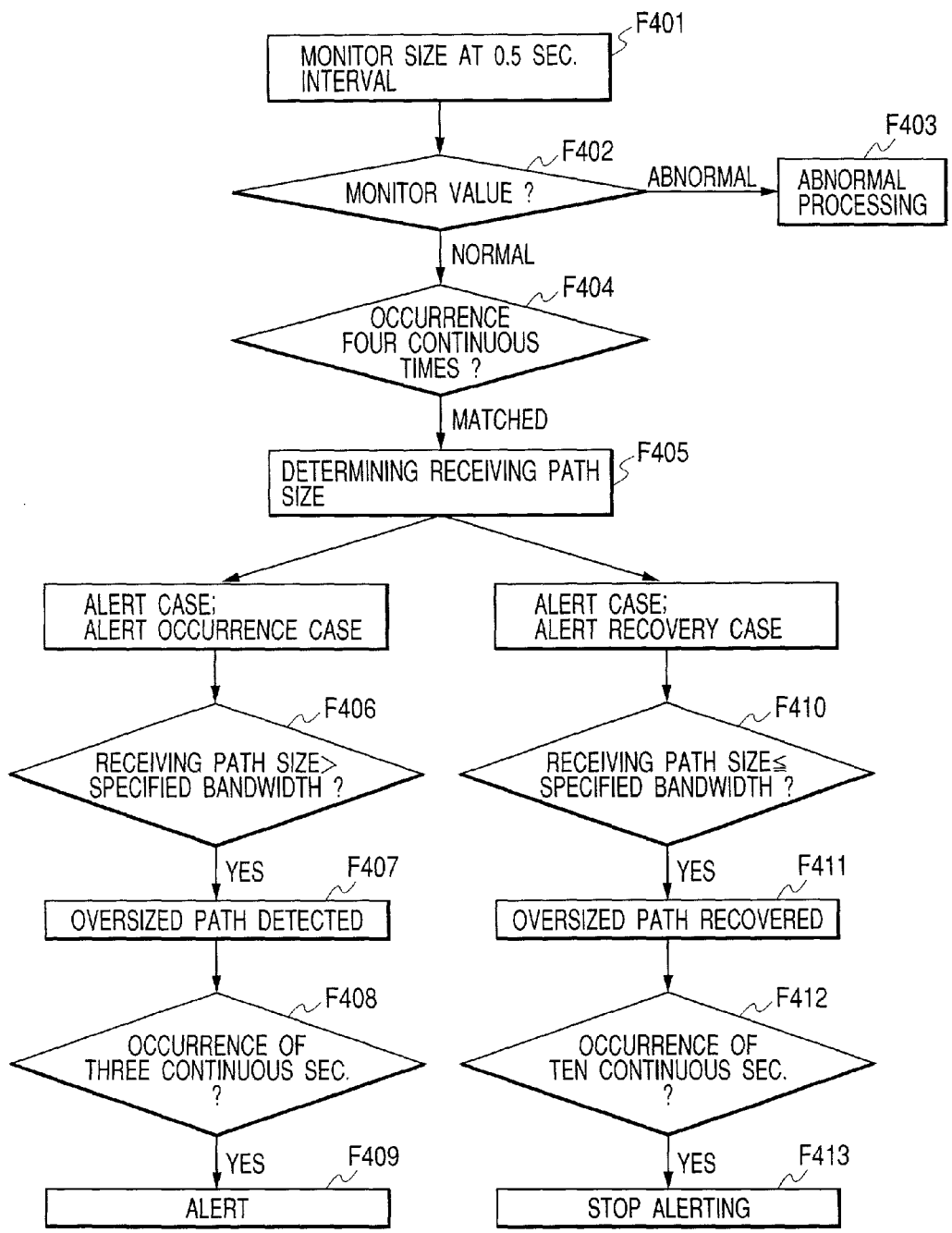
FIG. 4 shows the flow of a processing when each node detects an overpathsize alert.

FIG. 4 shows the flow of overpathsize alert detecting processing at a node.

At the same time as a path is set at a node, the monitoring of receive path size is started by hardware such as LSI inside each node, the result of monitoring is stored in a register and others and is summed.

The monitoring F401 of size is executed at a cycle of 0.5 second and in case a value of a monitor is abnormal F402, processing for an error F403 is executed.

The abnormality of a value of a monitor means an error of the contents of H1 and H2 bytes.

In case a normal value of the monitor continues continuously four times F404, receiving path size is determined F405.

Pathsize until the size is determined is kept a prior state.

When receiving path size is determined, it is checked whether a value of the monitor is coincident continuously four times or not, however, a procedure for checking a value of a monitor conforms to a procedure described in Bellcore GR-253 standard.

Next, a case that an alert is to be issued will be described. After receiving path size is determined, receiving path size and a band specified when a path is set are compared.

In case receiving path size exceeds a specified band F406, overpathsize is regarded as detected F407 and in case this state occurs continuously for three seconds F408, an overpathsize alert F409 is informed EMS.

Next, a case that an alert is recovered will be described. The case of the recovery of an alert is the same as the case of the occurrence and after receiving path size is determined, receiving path size and a band specified when a path is set are compared.

In case receiving path size is equal to or smaller than a specified band F410, overpathsize is regarded as recovered F411 and in case this state continues for ten seconds F412, it is informed EMS that overpathsize is recovered F413.

In this case, the detection of overpathsize is set to continuation for three seconds and the recovery of overpathsize is set to continuation for ten seconds, however, the condition of the setting also conforms to an alert information provision described in Bellcore GR-253 standard (occurrence of alert: 2.5 s.±0.5 s., recovery from alert: 10 s.±0.5 s.).

For additional information of an overpathsize alert, a detected node number (201, 202, 203 and 204 shown in FIG. 2), connection in the detected node (211, 212 and 213 shown in FIG. 2) and pathsize after change can be given.

EMS is required to identify a node and a path respectively directly causing overpathsize and analyze a range of a fault based upon the above-mentioned information and provide GUI that enables a user to promptly correspond.

Figure 5:
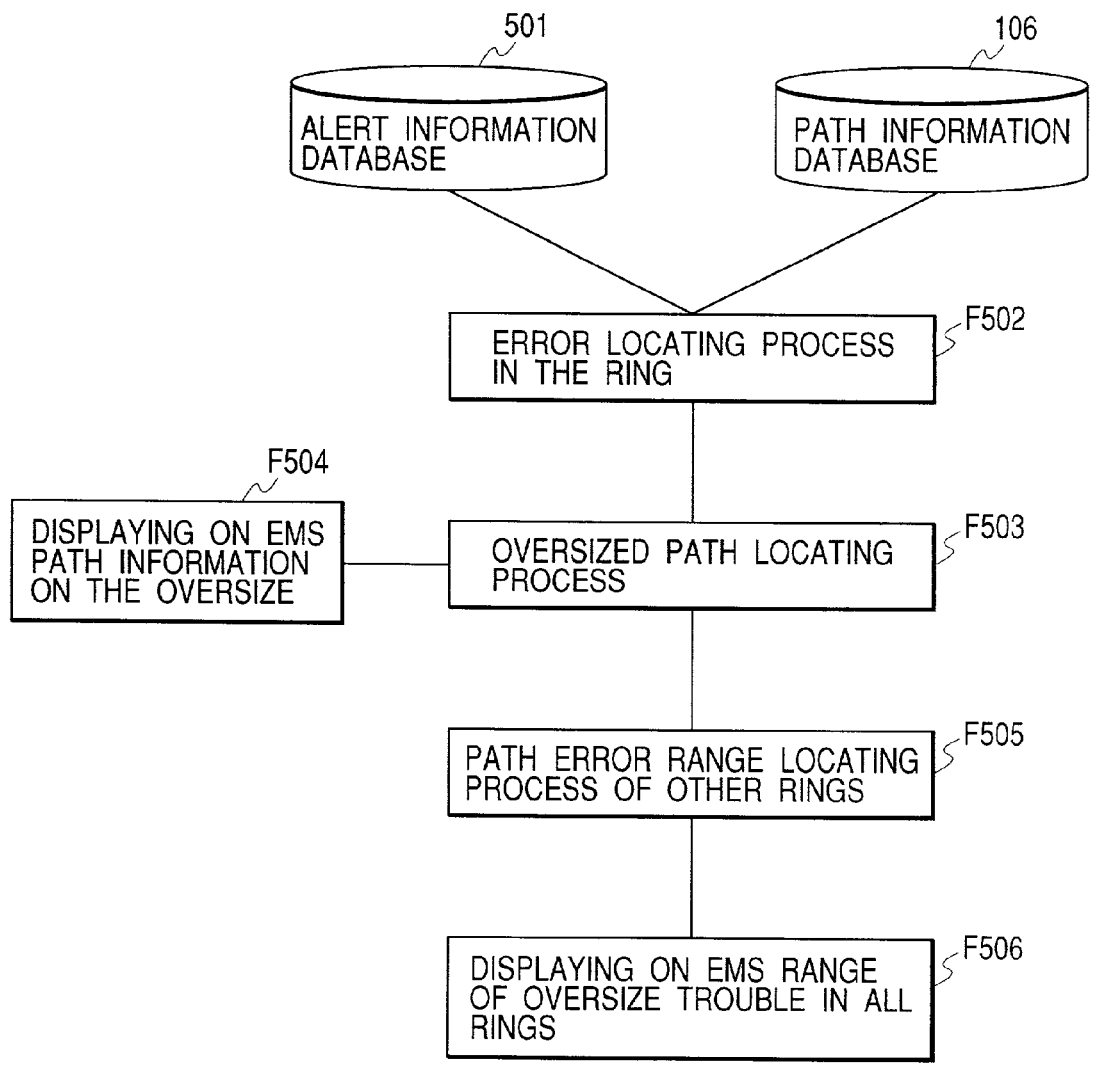
FIG. 5 shows the flow of processing for an operation system to identify a cause and to analyze a range of a fault when an overpathsize alert is caused.

FIG. 5 shows the flow of the identification of a cause of oversize when an overpathsize alert occurs and the analysis of a range of a fault by EMS.

First, EMS executes processing for identifying a path to be failure F502 in its own ring (a ring to which a crossconnecting device (a node) where an alert is detected belongs) based upon an overpathsize alert information database 501 and a path information database 106 respectively informed from the node and identifies the path to be failure.

The alert information database 501 includes a number of the ring to which the path where an alert is detected belongs, a node number, path connection information and path identification information and the path information database 106 includes path information in a network managed by EMS.

The path information (that is, path information in the network) also includes the ring number, the node number, path connection information, path identification information and size (band) control information.

Next, processing for identifying and recognizing the position of a path in a node at the head of nodes where an alert is detected F503 based upon a path identified by the processing for identifying a path to be failure F502 and the alert information database 501 is executed. For example, suppose that an overpathsize alert is detected in all the path connections 211, 212 and 213 on the path 214 shown in FIG. 2. A path at the head at this time means the connection 211.

That is, the head in the processing for identifying and recognizing the position of a path in a node at the head of nodes where an alert is detected F503 means being the closest to a node at which a signal (a path) transmitted from a low speed network is multiplexed and transmitted to a high speed transmission line, that is, the beginning of the path. The head path identified in the processing F503 is a path causing oversize and means that a signal is transmitted to the path at wrong size. In case the head path is the beginning of the path, it can be estimated that a cause of oversize lies in a path in another ring (that is, the ring constituted of the transmission apparatus 108 and the ATM device 109 respectively existing in the low speed network shown in FIG. 1).

In case another ring is also under the control of the same EMS and the path information of another ring can be also included in the path information database 106, a path in another ring causing oversize can be identified referring to the path information database 106 held by EMS. A user can promptly correspond by displaying the path information identified as the cause on the screen of EMS F504.

Next, a faulty path in own ring informed by an oversize alert is identified by the processing for identifying the faulty path F502, however, a range of the fault of the path to another ring is also required to be located. In this case, suppose that another ring is also under the control of the same EMS and path information in another ring can be also included in the path information database 106. If a destination of connection of a path isolated on the low speed side of paths identified by the processing for identifying a path F502 is identified, referring to the path information database 106 held by EMS, the path in another ring can be identified F505. Line failure may occur because of oversize on the path in another ring identified in the processing F505 (that is, the processing for identifying a path faulty range in another ring) and the path identified by the processing for identifying a path F502 in own ring and all these paths form the range of a fault. Therefore, a user can promptly act for recovery by displaying these path information on GUI F506.

As described above, the invention has the following effect.

A path can be changed to arbitrary pathsize at arbitrary time by using the pathsize automatic change mode, and the service capacity and the operability of the network are greatly enhanced. As size is automatically changed, the control of the size of each node when a path is set is not required, and the maintenance and control of the network can be also simplified by realizing the change of the size of the path without releasing the path.

A user can select a suitable mode depending upon the type of service by supporting both the pathsize fixation mode and the pathsize automatic change mode and flexible correspondence to service is enabled.

The maintenance and control of the network are simplified and stable service can be also provided by defining a new alert, collecting and analyzing it by the operation system, identifying the cause, clarifying a range of influence and others and providing GUI that enables a user to promptly correspond.

What is claimed is:

1. A path size control method for a cross-connecting device connected to an upstream side cross-connecting device via a first transmission line and to a downstream side cross-connecting device via a second transmission line so as to relay a communication frame received from the first transmission line to the second transmission line in a Synchronous Digital Hierarchy/Synchronous Optical Network (SDH/SONET) network, the method comprising the steps of:
    detecting index information indicating a size of a path from H1 and H2 bytes of a header of a first communication frame received from the first transmission line;
    setting new index information into H1 and H2 bytes of a header of a second communication frame to be transmitted to the second transmission line if the path size has been specified from a manager system of the network; and
    setting the detected index information into the H1 and H2 bytes of the header of the second communication frame if the path size has not been specified from the manager system of the network.

2. A path size control method according to claim 1, further comprising the steps of:
    designating the maximum bandwidth of the path previously from said manager system;
    comparing the path size determined from the index information detected from the H1 and H2 bytes of said first communication frame with said maximum bandwidth; and
    generating an alarm to be notified to said manager system when it is judged that the path size determined from the detected index information exceeds the maximum bandwidth.

3. A cross-connecting device connected to an upstream side cross-connecting device via a first transmission line and a downstream side cross-connecting device via a second transmission line so as to relay a communication frame received from the first transmission line to the second transmission line in a Synchronous Digital Hierarchy/Synchronous Optical Network (SDH/SONET) network, comprising:
   a first port connected to the first transmission line to receive a first communication frame;
   a second port connected to the second transmission line to transmit a second communication frame including data extracted from the first communication frame; and
   a path size determination means for detecting index information indicating the size of a path from H1 and H2 bytes of a header of the first communication frame and for setting the detected index information into H1 and H2 bytes of a header of the second communication frame if the path size has not been specified from a manager system of the network.

4. A cross-connecting device according to claim 3, wherein said path size determination means is comprised of:
   a memory for storing bandwidth information indicating the maximum bandwidth of the path designated from said manager system; and
   means for comparing the path size determined from the index information detected from the H1 and H2 bytes of said first communication frame with said maximum bandwidth and for generating an alarm to be notified to said manager system when it is judged that the path size determined from the detected index information exceeds the maximum bandwidth.

* * * * *